(12) United States Patent
Sinelli et al.

(10) Patent No.: US 10,851,831 B2
(45) Date of Patent: Dec. 1, 2020

(54) LOCKING RING, REAR VIEW DEVICE AND VEHICLE

(71) Applicant: SMR Patents S.à.r.l., Luxembourg (LU)

(72) Inventors: Garry Sinelli, Troy, MI (US); Paul R. Henion, Troy, MI (US)

(73) Assignee: SMR Patents S.à.r.l., Luxembourg (LU)

( * ) Notice: Subject to any disclaimer, the term of this patent is extended or adjusted under 35 U.S.C. 154(b) by 54 days.

(21) Appl. No.: 16/134,377

(22) Filed: Sep. 18, 2018

(65) Prior Publication Data

US 2019/0085889 A1    Mar. 21, 2019

(30) Foreign Application Priority Data

Sep. 19, 2017    (DE) .......................... 10 2017 121 737

(51) Int. Cl.
| | | |
|---|---|---|
| *F16C 11/10* | (2006.01) | |
| *E05D 11/10* | (2006.01) | |
| *B60R 1/076* | (2006.01) | |

(52) U.S. Cl.
CPC ............ *F16C 11/103* (2013.01); *B60R 1/076* (2013.01); *E05D 11/1085* (2013.01);
(Continued)

(58) Field of Classification Search
CPC . B60R 1/06; B60R 1/076; F16C 11/04; F16C 11/10; F16C 11/103; E05D 11/1078;
(Continued)

(56) References Cited

U.S. PATENT DOCUMENTS

| | | | | |
|---|---|---|---|---|
| 4,053,248 A | * | 10/1977 | Schultenkamper | ..... F16D 1/076 403/97 |
| 4,304,421 A | * | 12/1981 | Kuhbier | ................. A63C 5/065 403/97 |

(Continued)

FOREIGN PATENT DOCUMENTS

| | | |
|---|---|---|
| DE | 102 23 460 A1 | 12/2003 |
| DE | 10223460 A1 | 12/2003 |

(Continued)

OTHER PUBLICATIONS

German Office Action dated Apr. 13, 2018 of German application No. 10 2017 121 737.1.

*Primary Examiner* — Josh Skroupa
(74) *Attorney, Agent, or Firm* — Jones Day

(57) ABSTRACT

A locking ring with a center axis includes a first set of locking elements which extend radially from a first radial distance from the center axis of the locking ring to a second radial distance from the center axis, and which are arranged in a plurality of first groups including at least one locking element each, where the first groups are arranged in a circumferentially equidistant manner around the center axis, and a second set of locking elements, which extend radially from the first radial distance from the central axis to a third radial distance from the central axis, where the third radial distance is smaller than the second radial distance, and which are arranged in a plurality of second groups including at least one further locking element each. A rear view device for a vehicle and a motor vehicle with the rear view device are also described.

18 Claims, 3 Drawing Sheets

(52) U.S. Cl.
CPC . *E05D 2011/1035* (2013.01); *Y10T 16/54028* (2015.01); *Y10T 403/32459* (2015.01)

(58) Field of Classification Search
CPC ......... E05D 11/1085; E05D 2011/1035; Y10T 16/54028; Y10T 403/32368; Y10T 403/32418; Y10T 403/32426; Y10T 403/32442; Y10T 403/32451; Y10T 403/32459; Y10T 403/32557; Y10T 403/589
USPC ......... 403/97, 103, 104, 106–108, 113, 320; 248/477, 478; 16/334
See application file for complete search history.

(56) References Cited

U.S. PATENT DOCUMENTS

| | | | |
|---|---|---|---|
| 5,039,118 A * | 8/1991 | Huang | B62B 9/20 403/97 |
| 6,286,968 B1 * | 9/2001 | Sailer | B60R 1/0617 403/97 |
| 6,409,411 B1 * | 6/2002 | Crorey | B25J 15/0052 403/97 |
| 7,523,904 B2 * | 4/2009 | Carnevali | F16C 11/10 403/96 |
| 7,878,477 B2 * | 2/2011 | Courbon | B60R 1/0605 403/97 |
| 8,544,151 B2 | 10/2013 | Courbon et al. | |
| 8,720,845 B2 * | 5/2014 | Courbon | B60R 1/0612 248/479 |
| 9,095,946 B2 * | 8/2015 | Kotula | F16C 11/103 |
| 10,513,223 B2 * | 12/2019 | Umino | B60R 1/076 |
| 2018/0170262 A1 * | 6/2018 | Lang | B60R 1/076 |

FOREIGN PATENT DOCUMENTS

| | | |
|---|---|---|
| EP | 1 439 980 B1 | 5/2003 |
| EP | 1439980 B1 | 7/2004 |
| WO | WO 98/40593 A1 | 9/1998 |

* cited by examiner

LOCKING RING, REAR VIEW DEVICE AND VEHICLE

CROSS-REFERENCE TO RELATED ART

This application claims the benefit of foreign priority to German Patent Application No. DE 10 2017 121 737.1, filed Sep. 19, 2017, which is herein incorporated by reference in its entirety for all purposes.

BACKGROUND

1. Field of the Invention

The following description relates to a locking ring for a rear view device, a rear view device with locking rings and a motor vehicle with a rear view device.

2. Related Art

Different functions and devices can be incorporated into and/or controlled with the help of rear view devices. These include functions and devices to enhance, extend and/or sustain the functionality of the rear view device during normal or extreme conditions. This can include heating and/or cooling means, cleaning means such as wipers, liquid and/or gaseous sprays, actuator means for moving the rear view device or parts of it, such as for example a display, a camera system and/or parts of a camera system, having for example lenses, filters, light sources, adaptive optics like deformable mirrors, sensors and/or mirrors, and/or actuator means for inducing movement of other objects, for example parts of the vehicle and/or objects surrounding the vehicle. Furthermore, it can include linear tracks and/or rotating wheels, like for example a filter wheel, for exchanging optical elements, including for example lenses, mirrors, light sources, sensors, adaptive optics like deformable mirrors and/or filters.

Examples for functions and devices incorporated into and/or controlled with the help of rear view devices include illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rear view devices can include, for example, a tiredness detection system, a microsleep detection system, a distance and/or velocity determination system such as a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, including, for example, a seat ejection system, a direction indicator, a blind spot indicator, an approach system, a strong braking system, an emergency braking system, a charging status indicator, a vehicle mode system, including, for example, a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

A camera module to be used in a rear view device may include a plurality of different optical elements, such as a variety of sensors and light sources, as well as housing parts. The housing of a camera module can be made out of plastic, metal, glass, any other suitable material and/or any combinations thereof and can be used in combination with the techniques described below to change or modify the properties of the material or the material surface. Housings are, for example, described in German patent application No. 102016108247. Further, the camera can include for example CCD or CMOS or light field sensors, as for example described in German patent application No. 102011053999. Also an area of the sensor can be reserved for different purposes, for example to detect a test beam, as described in U.S. Pat. No. 8,031,224, which is hereby incorporated by reference in its entirety for all purposes. The camera module can also be equipped with apparatuses for light intensity adjustment as described for example in U.S. patent application Ser. No. 14/809,509, which is hereby incorporated by reference in its entirety for all purposes, and light level intensifier tubes as described in U.S. patent application Ser. No. 09/771,140, which is hereby incorporated by reference in its entirety for all purposes. Still further, the camera module or a cover adapted to the camera module can be moved using different actuators, drives and/or a flexible track as, for example, described in German application No. 102016108247.3.

The camera module may also include cleaning elements to clean the optical element facing outwards and being exposed to the environment. The cleaning element can, for example, include wipers, brushes, lips, nozzles, fans and similar elements as are described in European patent application No. 14165197.6, European patent application No. 13163677.1, and European patent No. 1673260 corresponding to US patent application No. 2007/273971, each of which is hereby incorporated by reference in its entirety for all purposes. The cleaning devices are not limited in composition, and may, for example, include any fabric, elastomeric, sponge, brush, or combination of these. Special wiper elements including wiper arms, wiper blades, wiping cloth, wiping tissue and combinations thereof are described in European patent application No. 14165197.6. A reservoir for holding a cleaning liquid is described in European patent application No. 14165197.6. Such a reservoir can be attached to or integrated into the camera module to provide the cleaning liquid to the optical elements of the camera module. Different methods may be used to detect dirt or other obscurations preventing or reducing the functioning of the camera module, such as described in U.S. Pat. No. 8,395,514, European patent No. 1328141, and U.S. Pat. No. 8,031,224, each of which is hereby incorporated by reference in its entirety for all purposes. Also light sources can be installed or integrated into the camera module to increase the visibility of surrounding objects, measure distances and directions and detect dirt, such as described in U.S. Pat. No. 8,031,224, U.S. patent application No. 62/470,658, and U.S. patent application Ser. No. 09/771,140, each of which is hereby incorporated by reference in its entirety for all purposes.

Different heating means, like heating coils, heating devices integrated into the lens holder or the bezel, or other heating elements can be used to impede condensation and icing at the surface of optical elements as, for example, described in German patent application No. 102016108247.3, U.S. patent application No. 62/470,658, and German patent application No. 102016107545.0, each of which is hereby incorporated by reference in its entirety for all purposes.

A watertight seal against weather effects, as well as against the influence of washing processes with detergents, solvents and high pressure cleaners can be used on the housing of the camera module as described in U.S. patent application Ser. No. 13/090,127, which is hereby incorporated by reference in its entirety for all purposes. In another example, the housing can be made of a body including plastic and conductive material, where the conductive material is dispersed in the plastic material to form a conductive mass to allow a power source, preferably a DC voltage source, to connect via at least two electrodes to the body and heat the body accordingly, as described in German patent application No. 102016107545.0. Different types of fixings can be used to fix the camera module to the vehicle or other components, such as for example the snap-fit connection described in U.S. Pat. No. 8,979,288, which is hereby incorporated by reference in its entirety for all purposes.

Rear view devices are known from the prior art, in particular in the form of rear view mirrors. They generally include a base, which is affixed to a vehicle, and a head which carries at least a mirror glass and/or a camera and often additional elements such as side turn indicators or the like. The head is usually mounted pivotally movable with respect to the base. This allows the head to move out of the way in case of a minor collision, thereby preventing damage to the head or injury to pedestrians who get hit by the rear view device. Furthermore, the head can be pivoted, either manually or by means of an automatic folding system, from an operating position, in which the rear view device enables the driver of the vehicle to receive a view in particular to the back, to a parking position, in which the head is folded against the side of the vehicle. This reduces the lateral extent of the vehicle with the mirror in the parking position and prevents accidental damage to the mirror of a parked vehicle.

Shape memory alloys (SMA) are used for various functions with rear view devices. US patent application No. 2016/347252, which is hereby incorporated by reference in its entirety for all purposes, relates to an actuator device for a rear view device of a motor vehicle having at least one retaining element; at least one adjusting element which can be transferred into a plurality of functional positions, in particular from a parking position into at least one operating position, at least one driving means which includes at least one shape-memory element which is, in particular, in the form of a wire, which extends between the retaining element and the adjusting element and can be or is secured to both, where the extension of said shape-memory element can be modified on being actuated, in particular on being electrically energized, and by means of the modification of the extension of which the at least one adjusting element can be transferred from one functional position into another functional position, in particular from the parking position into the operating position or vice versa, at least one heat-conducting means which lies in contact with the driving means at least in the end position of the adjusting element, and where at least one switching means, by means of which the at least one driving means and the at least one heat-conducting means can be or are arranged with respect to one another with no contact in the basic position of the adjusting element and/or by means of which the at least one driving means and the at least one heat-conducting means can be or are arranged touching one another at least in sections at least in the end position of the adjusting element. A further actuator for an exterior rear view mirror of a vehicle is known from European patent application No. 2781743 and has at least one actuator pin, at least one drum body enclosing a cavity, in which the actuator pin can be arranged or is arranged in a non-rotational manner, at least one clamping means which includes at least one shape-memory element which can be fixed or is fixed to the drum body and with which the drum body can be moved in a first rotational direction, and at least one return means which includes at least one shape-memory element which can be fixed or is fixed to the drum body and with which the drum body can be moved in a second rotational direction, characterized in that the clamping means and/or the return means can be fixed or are fixed on a winding portion of the drum body and in the winding portion of the drum body at least quarter of a winding, in particular at least half a winding, in particular an entire winding, in particular several windings are applied.

In order to secure the head in its respective positions relative to the base, the head and base usually include complementary locking elements. These can take the form of locking rings which are positioned around the pivot axis and fixed relatively to the head and base, respectively. In the operating position and/or the parking position, complementary detents of the locking rings are interlocked with each other, thus preventing accidental movement. Only if a certain amount of force is exerted around the pivot axis, the detents unlock and the mirror head can be moved between the respective positions.

The force used for unlocking the head acts primarily on the detents and causes frictional wear. This leads to a degradation of the locking mechanism over time and can, in particular, negatively affect the stability of the mirror head in its operating position.

U.S. Pat. No. 8,544,151 describes a pivoting detent joint with two detent rings, each of which includes multiple detents which are distributed in an asymmetrical manner around the circumference of the detent rings in order to define multiple locking positions. Such an arrangement requires that the depth of detents at each of the locking locations be the same, thus the effort to move the mirror head out of any locking location is the same which leads to greater wear on the system. Due to the asymmetric spacing of the detents, this also limits the locations of the multiple locking positions.

It is thus one aspect to provide locking rings and rear view devices which are particularly resilient against frictional wear and flexibility of design. In another aspect, vehicles with such rear view devices are described.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. In one aspect, a mounting assembly for an exterior attachment device which offers particularly good protection against theft of such external attachment devices is described.

In an aspect, a rear view device, in particular an external rear view mirror for a vehicle, includes a base portion and a head portion, wherein the head portion is pivotable relative to the base portion about a pivot axis, and wherein the base portion includes a first locking ring arranged coaxially with the pivot axis and the head portion includes a second locking ring arranged coaxially with the pivot axis, and wherein the first locking ring includes a first set of locking elements, which extend radially from a first radial distance r1 from the pivot axis to a second radial distance r2 from the pivot axis, and which are arranged in a plurality of first groups includes at least one first locking element each, wherein the first groups are arranged in a circumferentially equidistant manner around the first locking ring; and the first locking ring includes a second set of locking elements, which extend radially from the first radial distance r1 from the pivot axis to a third radial distance r3 from the pivot axis, wherein the third radial distance r3 is smaller than the second radial distance r2, and which are arranged in a plurality of second groups including at least one second locking element each, wherein the second groups are arranged in a circumferentially equidistant manner around the first locking ring; and the second locking ring includes a third set of locking elements, which is complementary to the first set of locking elements, and a fourth set of locking elements, which is complementary to the second set of locking elements.

The locking rings may be fixedly arranged with the base portion part and the head portion part of the pivot axis arrangement. The coaxial arrangement is to be understood such that a rotational symmetry axis of each locking ring coincides with the pivot axis.

In a locked position of such a rear view device, the first and second sets of locking elements may interlock with the third and fourth set of locking elements. An unlocking force exerted on the rear view device therefor may be distributed over all locking elements and distributed completely symmetrically over the locking rings. This provides an optimal load distribution, reduces wear in general and avoids uneven wear of the locking rings in particular.

The locking elements of the first and second set of locking elements may be raised with respect to a surface of the first locking ring. In other words, the locking elements of the first and second set may form detents, teeth, catches or lugs, which provide for a stable locking of the rear view device in its locked position.

The locking elements of the third and fourth set of locking elements may be recessed with respect to a surface of the second locking ring. The third and fourth set of locking elements may thus form complementary recesses or notches, which can stably hold the teeth or catches of the first and second set of locking elements.

This may also be reversed, i.e. the raised locking elements may be located on the second locking ring, while the recessed locking elements may be located on the first locking ring.

The locking elements may include a substantially V-shaped profile in circumferential direction. The flanks of such a V-shaped profile may provide a particularly large surface to distribute the unlocking forces upon, so that this embodiment is particularly resistant to wear. A substantially V-shaped profile may be understood to include two angled flanks which either connect directly in a point or via a short, flat or rounded intermediate portion. Such a profile can also be compared to a detent geometry leading to locking rings with detent ramps.

The first locking ring may include an annular base portion and a recess portion recessed axially relative to the base portion, wherein the recess portion extends in a radial direction from the first radial distance r1 to the second radial distance r2 and wherein the first and second set of locking elements are arranged on the recess portion. The recess portion can receive at least part of the second locking ring, thereby not only providing the desired locking effect, but also stabilization and guidance in the radial direction.

The second locking ring may include an annular base portion and a ring portion extending axially from the base portion, wherein the ring portion extends in a radial direction from the first radial distance r1 to the second radial distance r2 and wherein the third and fourth set of locking elements are arranged on the ring portion. The ring portion of the second locking ring may be inserted into the recess portion of the first locking ring, thereby providing a particularly stable arrangement.

In a first operational position of the rear view device, the first and second set of locking elements may be mutually engaged with the third and fourth set of locking elements. The first operational position of the rear view device may be the operating position which enables a rearward view for a driver to be taken. Since all locking elements are interlocked or mutually engaged in this position, it may be particularly stable. This may help to avoid an unwanted unlocking of the rear view device due to vibrations caused by the motion of the vehicle the device is attached to.

The second locking ring may include a fifth set of locking elements, which extend radially from the second radial distance r2 from the pivot axis to the third radial distance r3 from the pivot axis, and which are arranged in a circumferentially equidistant manner around the second locking ring, and which have a smaller axial extent than the locking elements of the third and fourth set of locking elements.

The fifth set of locking elements may provide a different locking position for the rear view device. Due to the shallower axial extent of the fifth set of locking elements, the unlocking force for this particular locking position may be lower than the unlocking force from the main locking position defined by the interaction of the first to fourth set of locking elements. This causes less wear to occur during that unlocking process. The different locking position may, for example, be used to lock the rear view device in a parking position where an accidental unlocking due to vibrations is not to be expected.

In a second operational position of the rear view device, the first set of locking elements may be mutually engaged with the fifth set of locking elements.

The amount of locking elements per group may vary, but preferably is between 3 to 5.

In an example, the number of detent ramps present may provide an advantage. That is, the area or linear length of the engaging detent ramps may be greatly increased. This significantly reduces the load applied to each ramp as the head portion is folded relative to the base portion, thus, reducing the wear for longer life of the detent system and, thus, the locking rings.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The term "rear view" is here defined as a view of the surrounding area, which is not in the field of view of a driver, i.e. the directions opposing, left, right, below and above of the viewing direction, but can also include the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Figure 1:
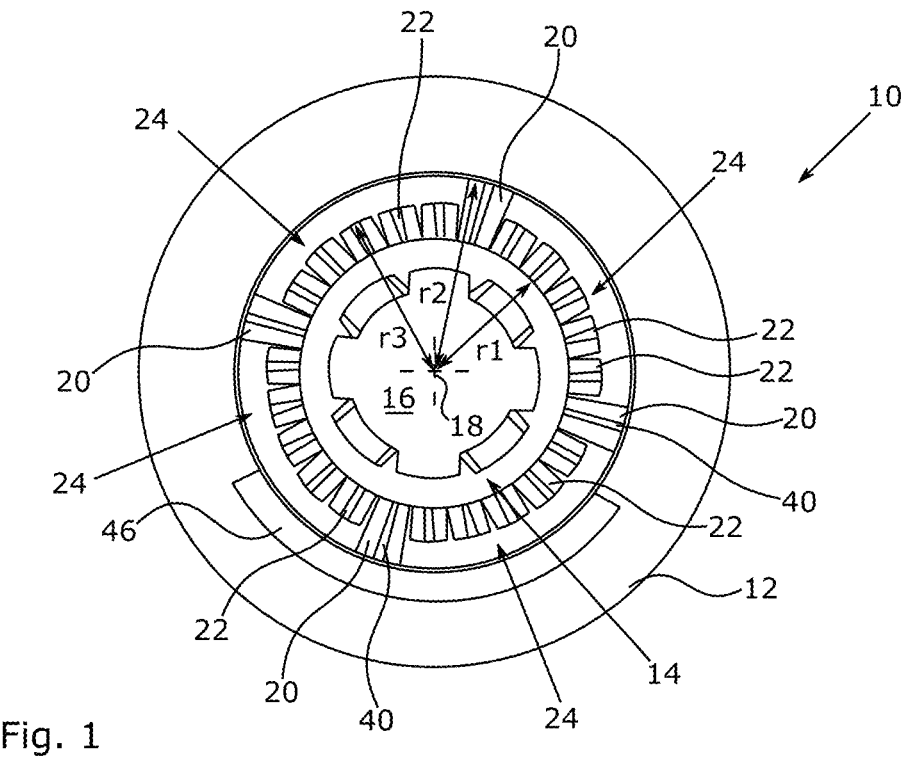
FIG. 1 is a diagram illustrating a top-down view of an example of a locking ring.
Figure 2:
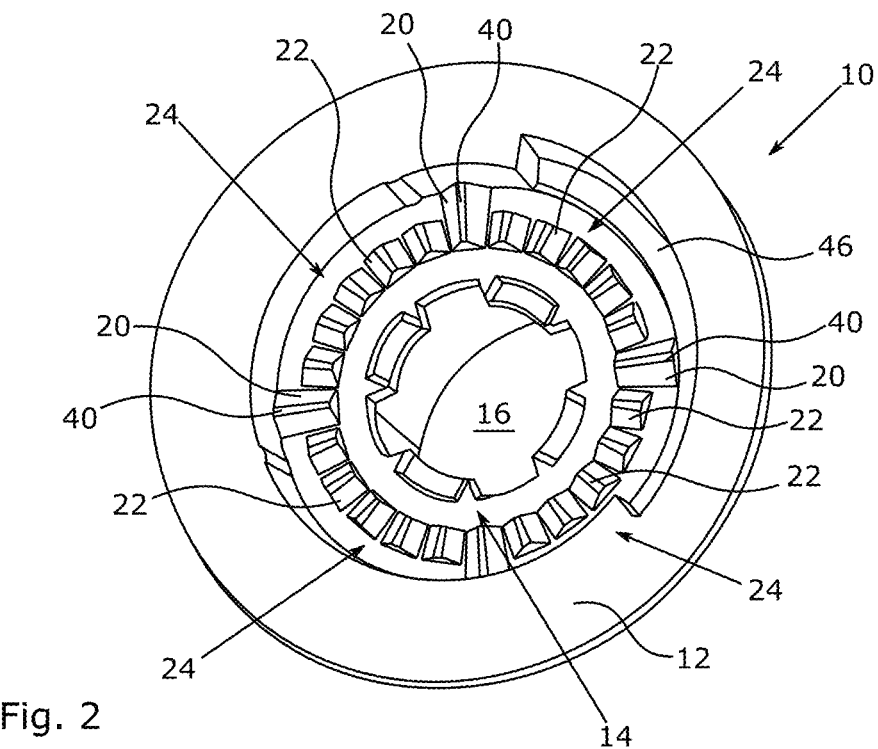
FIG. 2 is a diagram illustrating a perspective view of the locking ring of FIG. 1.

A first locking ring 10, as shown in FIGS. 1 and 2, includes an annular base portion 12 and a recess portion 14 formed around a central opening 16 and is substantially radially symmetrical around a center axis 18.

A first set of locking elements 20 is formed on the recess portion 14. The locking elements 20 are symmetrically distributed with an angular distance of 90° and extend from a radial distance r1 from the center axis 18 to a radial distance r2 from the center axis 18.

Second locking elements 22 are formed between the first locking elements 20 in four groups 24 of five locking elements 22 each, the groups being distributed in a radially symmetrical fashion around the recess portion 14. The second locking elements 22 extend from the first radial distance r1 to a third radial distance r3, which is shorter than the radial distance r2.

In this example, both the first locking elements 20 and the second locking elements 22 are formed in the shape of raised detents with a V-shaped cross-sectional profile, as can be seen in FIG. 2.

Figure 3:
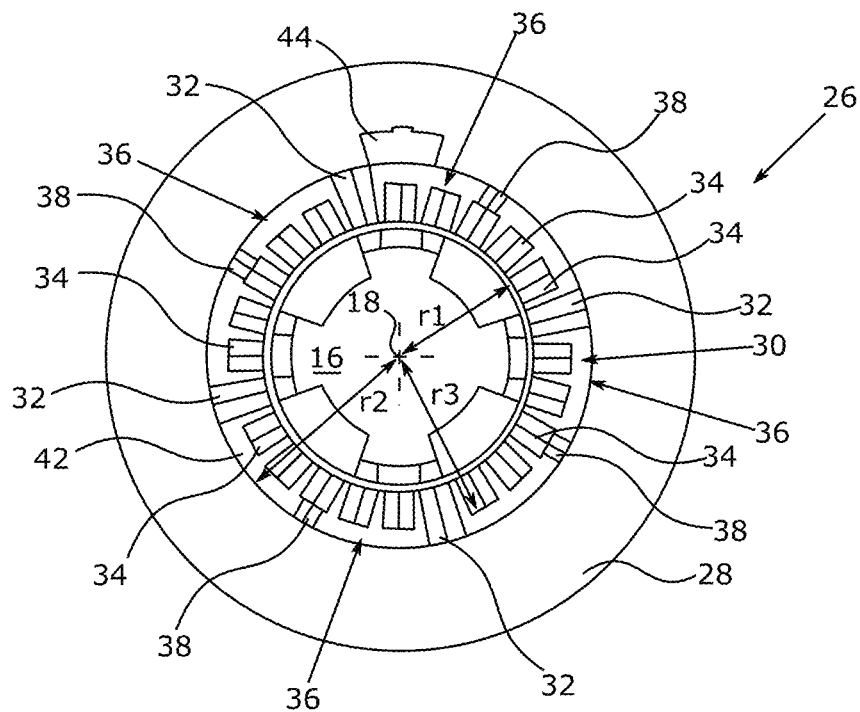
FIG. 3 is a diagram illustrating a top-down view of another example of a locking ring.
Figure 4:
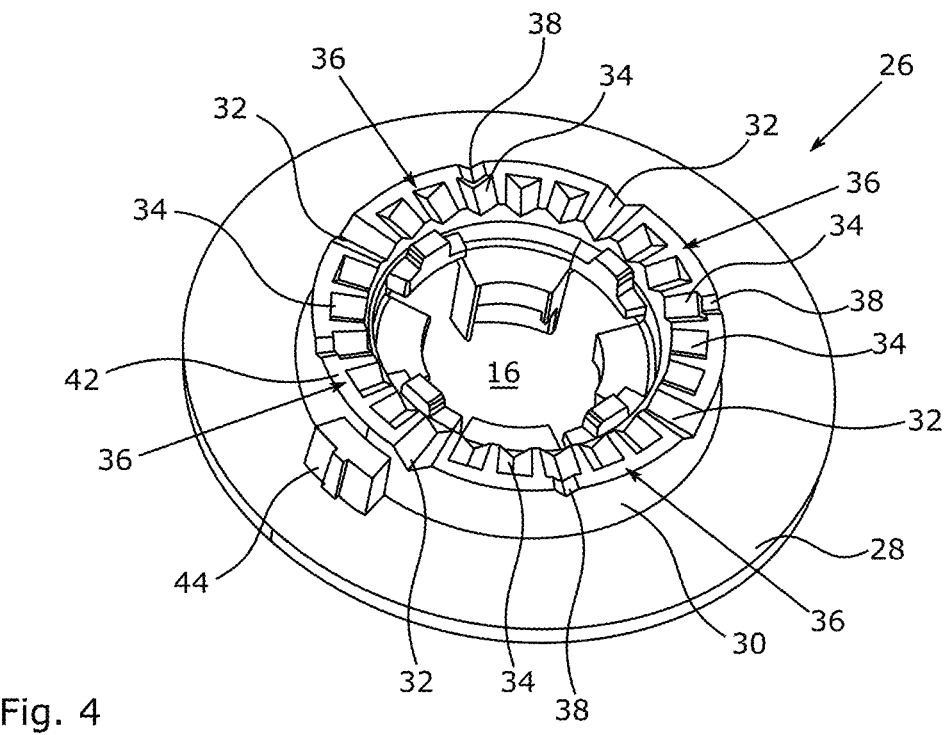
FIG. 4 is a diagram illustrating a perspective view of the locking ring of FIG. 3.

In another example as shown in FIGS. 3 and 4, a second locking ring 26 includes an annular base portion 28 and a ring portion 30 formed around the central opening 16, and is substantially radially symmetric around a center axis 18. The ring portion 30 may be raised with respect to the base portion 28.

In this example, a third set of locking elements 32 is formed on the ring portion 30. The locking elements 32 are symmetrically distributed with an angular distance of 90° and extend from a radial distance r1 from the center axis 18 to a radial distance r2 from the center axis 18.

In addition, fourth locking elements 34 may be formed between the third locking elements 32 in four groups 36 of five locking elements 34 each, the groups being distributed in a radially symmetrical fashion around the ring portion 30. The fourth locking elements 34 may extend from the first radial distance r1 to a third radial distance r3, which is shorter than the radial distance r2.

The second locking ring 26 may further include fifth locking elements 38 which are symmetrically distributed with an angular distance of 90° and extend from a radial distance r2 from the center axis 18 to a radial distance r3 from the center axis 18. Each fifth locking element 38 is aligned with a corresponding fourth locking element 34. The fifth locking elements 38, however, may be more shallow with respect to the axial direction of the locking ring 26.

The third locking elements 32, the fourth locking elements 34 and the fifth locking elements 38 may be formed in the shape of recessed detents with a V-shaped cross-sectional profile, as illustrated in FIG. 4.

In a rear view device (not shown), for example in a rear view mirror for a vehicle, the first locking ring 10 may be affixed to a base part of a pivot axis between a mirror base and a mirror head, while the second locking ring 26 may be affixed to a head part of the pivot axis, or vice versa.

In an operational position, in which the rear view mirror provides a rearward view to a driver of the vehicle, the first locking elements 20 may be engaged with the third locking elements 32 and the second locking elements 22 may be engaged with the fourth locking elements 34 in order to hold the mirror head secure in its operational position. The ring portion 30 of the second locking ring 26 may be inserted into the recess portion 14 of the first locking ring 10, providing radial stability to the arrangement.

In an example, if a rotational force is exerted on the mirror head, either manually by a user or by means of an electric drive, the locking elements 20, 22, 32, 34 disengage and the second locking ring 26 is lifted in axial direction relative to the first locking ring 10. The locking rings 10, 26 can now be freely rotated relative to each other. During the rotation, the tips 40 of the first locking elements 20 glide on a rim portion 42 of the ring portion 30 of the second locking ring 26.

After a degree of rotation 45, the first locking elements 20 may reach the fifth locking elements 38 and interlock with them. This may define a second fixed position of the rear view mirror, preferably a parking position, in which the rear view mirror is folded against the side of the vehicle.

For example, the movement can be reversed by exerting a rotational force on the mirror head in the opposite direction. Since the fifth locking elements 38 are shallower than the third locking elements 32, less force may be needed to disengage the locking elements 32, 38. The mirror head can now be moved back to its normal operating position, in which the first locking elements 20 are engaged with the third locking elements 32 and the second locking elements 22 are engaged with the fourth locking elements 34.

In order to limit the movement range of the mirror head, the second locking ring 26 may include a stopper 44 which inserts into a guiding groove 46 of the first locking ring 10, thus defining the possible rotational movement range of the locking rings 10, 26 relative to each other.

Figure 5:
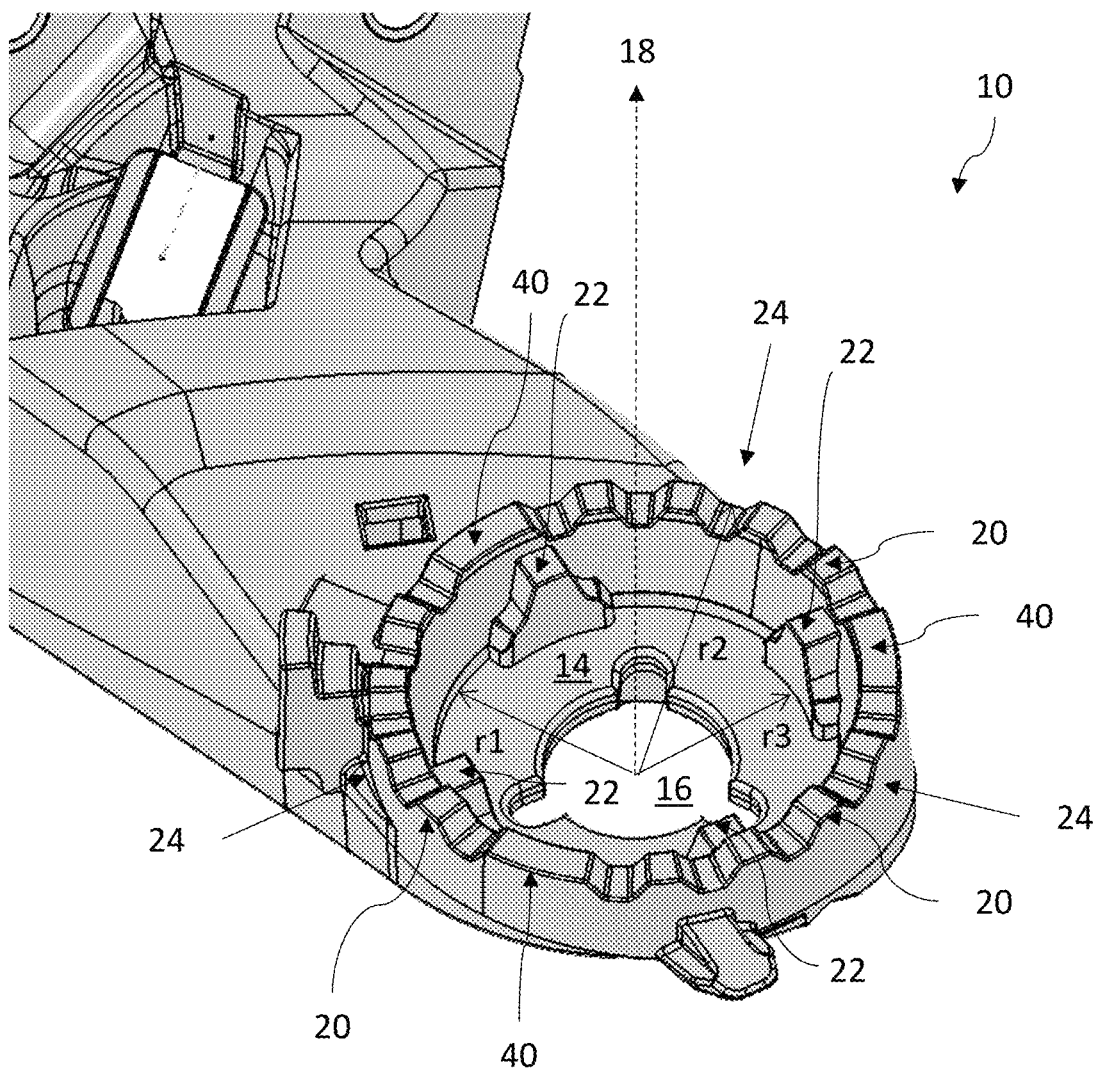
FIG. 5 is a diagram illustrating a further example of a locking ring.

Another first locking ring 10, as shown in FIG. 5, may include an annular base portion 12 and a recess portion 14 formed around a central opening 16 and may be substantially radially symmetric around a center axis 18.

In this example, a first set of locking elements 20 is formed on the recess portion 14. The locking elements 20 are arranged in three groups 24 each including four locking elements 20. The groups 24 may be symmetrically distributed with an angular distance of 120° and extend from a radial distance r1 from the center axis 18 to a radial distance r2 from the center axis 18. The groups 24 of first locking elements may be separated from each other by a tip 40. The tip 40 may have a larger extension in circumferential direction around the center axis 18 compared to a single locking element in the group of locking elements 24. However, the group of first locking elements 24 may have a larger extension in a circumferential direction around the center axis 18 compared to a single tip 40. The width of the first locking elements 20 and the tips 40 in a radial direction may be equal.

Second locking elements 22 may be formed in front of the first locking elements 20 in four groups. Due to three groups of first locking elements 20 and four second locking elements 22, the position of the second locking elements 22 changes relative to the position of the first locking elements 20 around the first locking ring 10. For example, the second locking elements 22 extend from the first radial distance r1 to a third radial distance r3, which is shorter than the radial distance r2. The width of the first and second locking elements 20, 22 in radial direction may be equal.

The shape of the first locking elements 20 may include rising and falling flanks, each with a preferably parallel section between the flanks. The shape of the second locking elements may correspond to a tooth with a flat highest side preferably parallel to the flat sections of the first elements.

The second locking ring 26 is not shown here for the embodiment of FIG. 5 but may include a shape and structure adapted to fit together with the locking ring 10.

In a rear view device (not shown), for example in a rear view mirror for a vehicle, the first locking ring 10 according to FIG. 5 may be affixed to a base part of a pivot axis between a mirror base and a mirror head, while the second locking ring 26 may be affixed to a head part of the pivot axis, or vice versa.

In at least one aspect, a rear view device and locking discs which allow for a stable locking of the mirror head in its operational position and which minimize wear to the locking discs during the folding movement is described.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGN LIST 10 locking ring
12 base portion
14 recess portion
16 opening
18 center axis
20 first locking element
22 second locking element
24 group
26 locking ring
28 base portion
30 ring portion
32 third locking element
34 fourth locking element
36 group
38 fifth locking element
40 tip
42 rim portion
44 stopper
46 guiding groove

What is claimed is:

1. A locking ring with a center axis for a rear view device, comprising:
    a first set of locking elements which extend radially from a first radial distance from the center axis to a second radial distance from the center axis, and which are arranged in a plurality of first groups comprising at least one locking element each, the plurality of first groups being arranged in a circumferentially equidistant manner around the center axis;
    a second set of locking elements which extend radially from the first radial distance from the central axis to a third radial distance from the central axis, the third radial distance being smaller than the second radial distance, and the second set of locking elements being arranged in a plurality of second groups comprising at least one further locking element each, the plurality of second groups being arranged in a circumferentially equidistant manner around the locking ring; and
    a third set of locking elements which extend radially from the second radial distance from the center axis to the third radial distance from the center axis, which are arranged in a circumferentially equidistant manner around the locking ring, and which have a smaller axial extent than the locking elements of the first set of locking elements and the second set of locking elements,
    wherein the plurality of first groups and the plurality of second groups are arranged alternately gapless.

2. The locking ring according to claim 1, wherein the number of at least one of the plurality of first groups and the plurality of second groups is selected to be three groups, four groups, or five groups.

3. The locking ring according to claim 1, wherein the first set and the second set of locking elements project from a main surface of the locking ring defined by a radially extending recess portion or a raised ring portion of the locking ring.

4. The locking ring according to claim 1, wherein the first set and the second set of locking elements are recessed with respect to a main surface of the locking ring defined by a radially extending recess portion or a raised ring portion of the locking ring.

5. The locking ring according to claim 1, wherein each of the third set of locking elements is aligned to one of the second set of locking elements.

6. The locking ring according to claim 1, wherein the first set, the second set, and the third set of locking elements comprise a substantially V-shaped profile in a circumferential direction.

7. A rear view device for a vehicle, comprising:
a base portion comprising a first locking ring having a center axis; and
a head portion comprising a second locking ring having a center axis, and being pivotable relative to the base portion around a pivot axis,
wherein the center axis of the first locking ring is arranged coaxially with the pivot axis and the center axis of the second locking ring is arranged coaxially with the pivot axis, and at least one of the first and the second locking rings comprises:
a first set of locking elements which extend radially from a first radial distance from the center axis to a second radial distance from the center axis, and which are arranged in a plurality of first groups comprising at least one locking element each, the plurality of first groups being arranged in a circumferentially equidistant manner around the center axis; and
a second set of locking elements which extend radially from the first radial distance from the center axis to a third radial distance from the center axis, the third radial distance being smaller than the second radial distance, and the second set of locking elements being arranged in a plurality of second groups comprising at least one further locking element each, the plurality of second groups being arranged in a circumferentially equidistant manner around the locking ring,
the plurality of first groups and the plurality of second groups are arranged alternately gapless,
the first locking ring comprises first locking elements of the first set of locking elements and second locking elements of the second set of locking elements,
the second locking ring comprises third locking elements of the first set of locking elements which are complementary to the first locking elements of the first locking ring, and fourth locking elements of the second set of locking elements which are complementary to the second locking elements of the first locking ring,
the second locking ring further comprises fifth locking elements of a third set of locking element, and
in an operational position of the rear view device, the first locking elements are mutually engaged with the fifth locking elements.

8. The rear view device according to claim 7, wherein the first and second locking elements are raised with respect to a main surface of the first locking ring, and the third and fourth locking elements are recessed with respect to a main surface of the second locking ring.

9. The rear view device according to claim 8, wherein the first locking ring comprises an annular base portion and a recess portion recessed axially relative to the annular base portion,
the recess portion extends in a radial direction from the first radial distance to the second radial distance, and
the first and second locking elements are arranged on the recess portion.

10. The rear view device according to claim 8, wherein the second locking ring comprises an annular base portion and a ring portion extending axially from the annular base portion,
the ring portion extends in a radial direction from the first radial distance to the second radial distance, and
the third and fourth locking elements are arranged on the ring portion.

11. The rear view device according to claim 7, wherein the first and second locking elements are recessed with respect to the main surface of the first locking ring, and the third and fourth locking elements are raised with respect to the main surface of the second locking ring.

12. The rear view device according to claim 11, wherein the second locking ring comprises an annular base portion and a recess portion recessed axially relative to the base portion,
the recess portion extends in a radial direction from the first radial distance to the second radial distance, and
the third and fourth locking elements are arranged on the recess portion.

13. The rear view device according to claim 11, wherein the first locking ring comprises an annular base portion and a ring portion extending axially from the base portion,
the ring portion extends in a radial direction from the first radial distance to the second radial distance, and
the first and second locking elements are arranged on the ring portion.

14. The rear view device according to claim 11, wherein
the first locking ring comprises fifth locking elements of a third set of locking elements, and
in an operational position of the rear view device, the third locking elements are mutually engaged with the fifth locking elements.

15. The rear view device according to claim 7, wherein, in a first operational position of the rear view device, the first and second locking elements are mutually engaged with the third and fourth locking elements.

16. The rear view device according to claim 7, wherein a stopper provided by the second locking ring is configured to engage a guiding groove provided by the first locking ring in order to define a rotational movement range of the first and second locking rings relative to each other.

17. A motor vehicle with at least one rear view device according to claim 7.

18. A rear view device for a vehicle, comprising:
a base portion comprising a first locking ring having a center axis; and
a head portion comprising a second locking ring having a center axis, and being pivotable relative to the base portion around a pivot axis,
wherein the center axis of the first locking ring is arranged coaxially with the pivot axis and the center axis of the second locking ring is arranged coaxially with the pivot axis, and at least one of the first and the second locking rings comprises:
a first set of locking elements which extend radially from a first radial distance from the center axis to a second radial distance from the center axis, and which are arranged in a plurality of first groups comprising at least one locking element each, the plurality of first groups being arranged in a circumferentially equidistant manner around the center axis; and
a second set of locking elements which extend radially from the first radial distance from the central axis to a third radial distance from the central axis, the third radial distance being smaller than the second radial distance, and the second set of locking elements being arranged in a plurality of second groups comprising at least one further locking element each, the plurality of second groups being arranged in a circumferentially equidistant manner around the locking ring,
the plurality of first groups and the plurality of second groups are arranged alternately gapless, the first locking ring comprises first locking elements of the first set of locking elements and second locking elements of the second set of locking elements, the second locking ring comprises third locking elements of the first set of locking elements which are complementary to the first locking elements of the first locking ring, and fourth locking elements of the second set of locking elements which are complementary to the second locking elements of the first locking ring, the first and second locking elements are recessed with respect to the main surface of the first locking ring, and the third and fourth locking elements are raised with respect to the main surface of the second locking ring, the first locking ring comprises fifth locking elements of a third set of locking elements, and in an operational position of the rear view device, the third locking elements are mutually engaged with the fifth locking elements.

* * * * *